Figure 1:
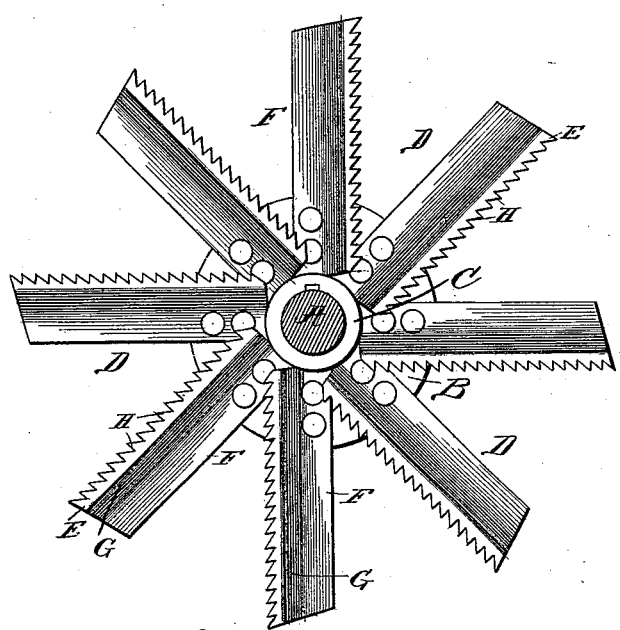

(No Model.) 2 Sheets—Sheet 1.

G. N. TODD.
CLEANER DEVICE FOR COTTON HARVESTERS.

No. 423,542. Patented Mar. 18, 1890.

Witnesses.
Wm. Rheems
Will R. Owhundro

Inventor:
Geo N. Todd
By Jno. G. Elliott
Atty.

(No Model.) 2 Sheets—Sheet 2.

G. N. TODD.
CLEANER DEVICE FOR COTTON HARVESTERS.

No. 423,542. Patented Mar. 18, 1890.

Witnesses.
Wm R Rheem
Will P. ...

Inventor.
George N. Todd
By Jno S Elliott
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

CLEANER DEVICE FOR COTTON-HARVESTERS.

SPECIFICATION forming part of Letters Patent No. 423,542, dated March 18, 1890.

Application filed December 13, 1887. Serial No. 257,762. (No model.)

*To all whom it may concern:*

Be it known that I, GEORGE N. TODD, a citizen of the United States, residing in Chicago, county of Cook, and State of Illinois, have invented certain new and useful Improvements in Picker-Stem Cleaner Devices for Cotton-Harvesters, of which the following is a specification.

This invention relates to improvements in cleaner devices for removing gathered cotton from the picker-stems of a cotton-harvester, and is more especially designed as an improvement upon the invention set forth in my application for Letters Patent of the United States, Serial No. 218,853, filed by me November 15, 1886. In that application the cleaner devices consisted of disk-like brushes, or else disks having one or both surfaces provided with teeth for engaging the cotton, said disks being caused to rotate in the same direction, but faster than the picker-stems traveled, by suitable mechanism deriving power from the same mechanism as the picker-stems. This device was intended not only to remove the gathered cotton from the stems during their passage across the face thereof, but also to immediately discharge such cotton into a receptacle located at one side of the machine, so that the cotton engaged by the disks would not be held and carried by them during an entire revolution thereof. Practice, however, has developed some objections to this style of cleaner, chief among which is the fact that they create a draft by their rapid revolution, which tends to blow the cotton out of reach of their teeth and to discharge at improper points cotton insecurely engaged by the teeth or lying upon the disks unengaged. With such devices there is also danger of the cotton being carried beyond the discharge-point and being held during one or more revolutions of the disks, in which case it will soon become matted down and render the disk practically useless.

The prime object of this invention is to remove the gathered cotton from picker-stems by means of cleaner devices which shall create a suction or draft tending to draw the cotton into engagement with the teeth thereof, whereby cotton not actually in the line of travel of the teeth may be brought into engagement therewith and held until properly discharged therefrom.

Another object is to reduce the toothed surface to a minimum number of teeth without detracting from, but on the contrary promoting, the effectiveness of the device, whereby "matting down" of the cotton is prevented and the proper delivery of the cotton to the receiving-chamber of the cotton-harvester correspondingly promoted.

A further object is to combine with the teeth of a cleaner device wings of such character that when the device is rotated they will not produce a current or blast of air tending to blow the cotton out of reach of the teeth, but on the contrary will produce a current or suction toward said teeth, which will bring within reach of the teeth cotton normally out of their line of travel.

A still further object is to combine such a cleaner device with a cotton-harvester so constructed that the draft created by the device will be utilized to aid the centrifugal force thereof in discharging the cotton into the receiving-chamber of the machine at a proper point, whereby the danger of clogging the device is avoided.

I attain these objects by devices illustrated in the accompanying drawings, in which—

Figure 2:
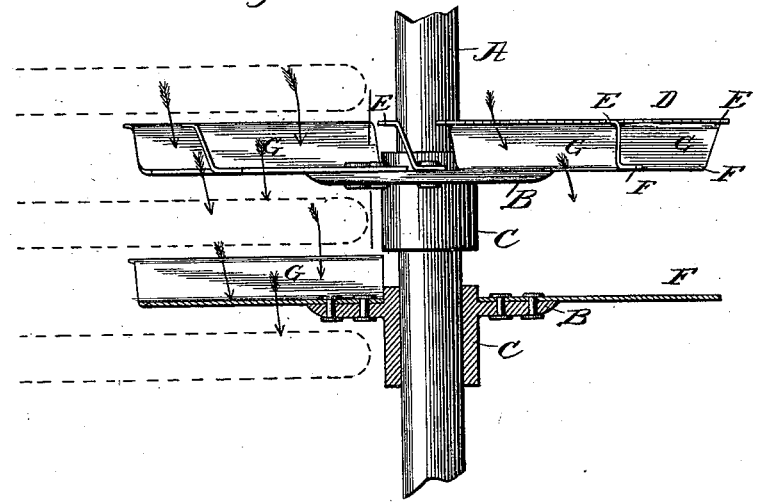
Figure 3:
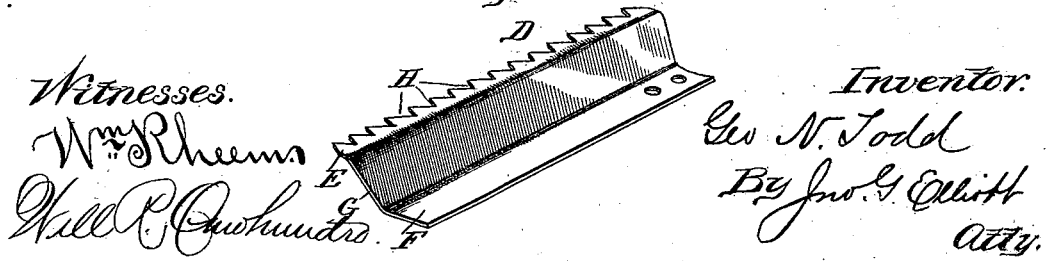
Figure 4:
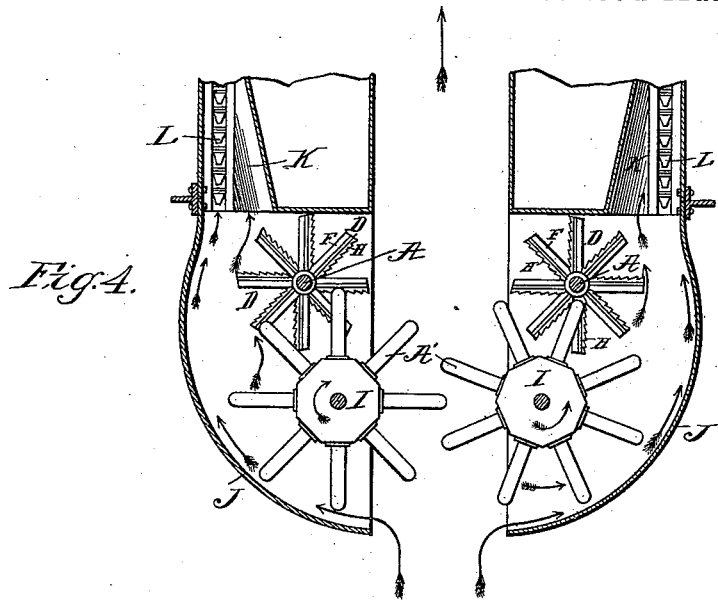
Figure 5:
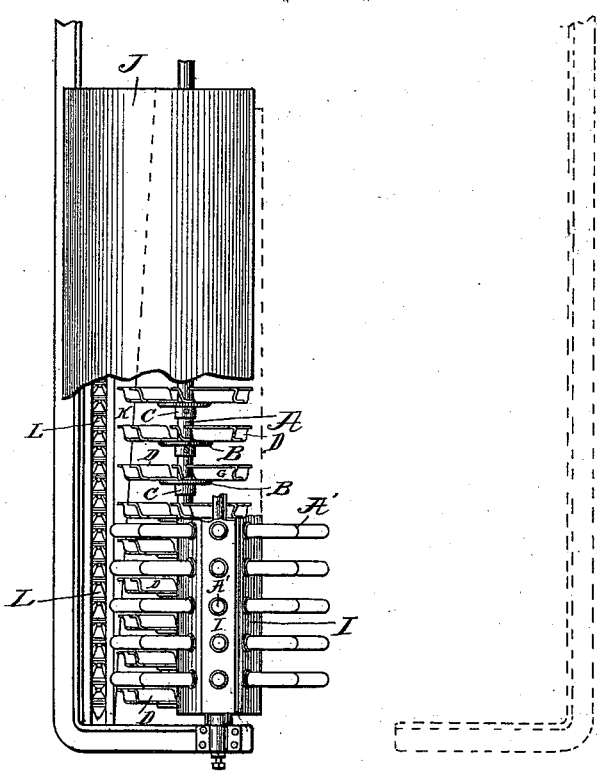

Figure 1 represents a plan view of a cleaner device embodying my invention; Fig. 2, a sectional elevation thereof; the dotted lines indicating the position of picker-stems relative to the cleaner device while being cleaned; Fig. 3, a detail perspective view of one of the wings; Fig. 4, a plan view of a portion of a cotton-harvester, showing my cleaner device applied thereto; Fig. 5, a rear elevation of one half or section thereof.

Similar letters of reference indicate the same parts in the several figures of the drawings.

Referring by letter to the accompanying drawings, A indicates a rotatable vertical shaft journaled in the frame of a cotton-harvester to which power is communicated in any well-known and convenient manner, the power being regulated so that the cleaner devices carried by said shaft may rotate in proper time relative to the movement of the picker-stems A', arranged in tiers across the faces of the cleaners, also arranged in tiers alternating with the picker-stems, said stems generally being driven by the same power as that of the cleaner devices with suitable gear-connections between them. Keyed to this shaft at regular intervals are a series of circular plates or disks B, having hubs C, through which the shaft passes axially, to which disks are secured a series of horizontal arms D, projecting radially therefrom and constituting the operative or working surface of the cleaner as a whole. These arms in their preferred form (shown in the drawings) consist of sheet metal bent so that two portions E F, extending longitudinally thereof, are in horizontal but different planes, both vertically and horizontally, and are connected by an inclined portion G, which extends from the rear edge of the upper part E down to the front edge of the lower part F, or inclines downwardly and toward the rear with relation to the direction of rotation of the cleaner—that is, in the reverse direction thereto. The lower portion F only comes in contact with and is secured to the disk. The upper part E of said arm has teeth H cut therein, or independent teeth secured thereto for engaging the cotton upon the stems as the latter are passed across the face of the cleaner, which teeth are, however, preferably angular or inclined toward the free ends of the frames, in order that they may offer no substantial resistance to the centrifugal force of the rapidly-revolving cleaner, by which in a great measure the cotton is in turn discharged from the cleaner. The part G of the arms, being inclined forwardly toward the upper edge thereof in the direction of rotation of the cleaner, acts like the wings of a fan or windmill, and not only directs the air with which it comes in contact downwardly, but by such action creates a current of air toward it from above similar to an exhaust-fan.

In applying my device to a cotton-harvester a number of the devices are arranged in tiers upon a vertical shaft, which in turn is journaled in the harvester-frame just forward of the picker-stem support I, as shown in Figs. 4 and 5, and to one side of the central way or passage, through which the cotton-plants pass, so that the stems in their travel will pass between the devices and across the toothed face thereof. As this invention has no particular reference to the detailed construction of the cotton-harvester, except the cleaner devices, these views, Figs. 4 and 5, are intended simply as diagrams for showing the relative location of the parts with which the cleaners co-operate; hence the picker-stem support is shown as a rotatable cylinder with picker-stems projecting radially therefrom, the whole partially surrounded by a shield J, secured to the frame, which also partially surrounds the cleaner, and therefore constitutes one wall of a chamber in which the stems and cleaners work. In the forward wall of this chamber is formed an opening K, leading to the cotton-receiving chamber, in which a traveling toothed belt L works in an inclined plane, by means of which the cotton is elevated and discharged therefrom into bags or other receptacles provided for that purpose, as clearly set forth in detail in an application for Letters Patent of the United States filed by me January 1, 1887, Serial No. 224,684.

It will be seen by the arrows in Fig. 4 that the picker-stems and cleaner devices both revolve toward the opening K in said chamber, thereby producing a general current of air in said chamber, which cannot escape until it reaches the said opening, thereby tending to carry with it through the opening all the cotton released from the picker-stems, thus materially aiding the centrifugal force of the cleaner devices, and the downward tendency of the air-current produced by such devices tends to drive the cotton directly into the carrier in the cotton-receiving chamber.

Having described my invention, what I claim, and desire to secure by Letters Patent, is—

1. The combination, with a cotton-harvester, of a rotatable cleaner device consisting of radial toothed arms provided with wings depending from the toothed portion thereof and inclining to the rear or in reverse direction to the rotation of said device, substantially as described.

2. In a cotton-harvester, the combination of a vertical rotatable shaft, and a cleaner device consisting of disks secured to said shaft provided with radial arms, said arms each consisting of a toothed bar and wing depending and inclining rearwardly from the toothed portion thereof, substantially as described.

3. The combination, in a cotton-harvester, of the traveling picker-stems arranged in tiers, a cotton-receiving chamber adjacent thereto, a shield partially surrounding said stems, rotatable cleaner devices arranged in tiers alternating with said tiers of stems and located between the stems and receiving-chamber, said devices being provided with toothed arms and wings inclining downwardly and rearwardly from the toothed portion thereof, substantially as described.

GEORGE N. TODD.

Witnesses:
WILL R. OMOHUNDRO,
W. W. ELLIOTT.